May 2, 1939.　　　　M. C. SCHWAB　　　　2,156,313
DISPENSING AND PACKAGING DEVICE FOR FLUIDS
Filed Jan. 11, 1936　　　5 Sheets-Sheet 1

INVENTOR,
Martin C. Schwab,
BY Paul Carpenter
HIS ATTORNEY.

May 2, 1939. M. C. SCHWAB 2,156,313
DISPENSING AND PACKAGING DEVICE FOR FLUIDS
Filed Jan. 11, 1936 5 Sheets-Sheet 2

INVENTOR,
Martin C. Schwab,
BY Paul Carpenter
HIS ATTORNEY.

May 2, 1939. M. C. SCHWAB 2,156,313
DISPENSING AND PACKAGING DEVICE FOR FLUIDS
Filed Jan. 11, 1936 5 Sheets-Sheet 3

INVENTOR,
Martin C. Schwab
BY
Paul Carpenter
HIS ATTORNEY.

May 2, 1939.  M. C. SCHWAB  2,156,313
DISPENSING AND PACKAGING DEVICE FOR FLUIDS
Filed Jan. 11, 1936  5 Sheets-Sheet 5

INVENTOR,
Martin C. Schwab,
BY Paul Carpenter
HIS ATTORNEY.

Patented May 2, 1939

2,156,313

UNITED STATES PATENT OFFICE 2,156,313

DISPENSING AND PACKAGING DEVICE FOR FLUIDS

Martin C. Schwab, Chicago, Ill.

Application January 11, 1936, Serial No. 58,649

11 Claims. (Cl. 128—214)

This invention relates to liquid dispensing apparatus of the general character referred to in my application Serial No. 750,392, filed October 27, 1934, and that of my application Serial No. 698,544, filed Nov. 17, 1933, now Patent No. 2,010,417, granted August 6, 1935, and is directed to certain improvements thereover.

This invention is particularly directed to the provision of liquid dispensing apparatus having certain advantages over my aforementioned application and patent in that the dispensing assembly and container may be merchandised as a unitary assembly, requiring the minimum amount of handling to put the same to use.

In my prior applications and patent aforementioned, the dispensing apparatus and container for the liquid comprise, in general, separately attachable units which may be interchangeably used. In my present invention, I contemplate including the dispensing apparatus more or less as part of the container, which may be centrally assembled and distributed, wherever desired.

To put the device contemplated by my present invention into use, it is necessary only to break the seal or cap of the container, and the device will forthwith be available for the purpose contemplated, such, for example, as intravenous, subcutaneous injections, with no requirement for sterilization of the dispensing device, as it reaches the user in sterile condition, or otherwise in readiness for the desired purpose.

Other objects of my invention, including features embodied in my prior applications, reside in the association with containers for dispensing liquids, particularly liquids for dispensing subcutaneous, intravenous injections, of compact dispensing assemblies more or less forming part of the container, yet providing, in a simple and economical manner, the certainty and security of action of the more costly dispensing elements in my prior applications.

Such objects and advantages inherent in my construction will become apparent and will be more clearly pointed out as this description proceeds, and for this purpose I refer to the accompanying drawings, forming a part hereof, in which—

Making reference to the drawings, it will be understood that all of the views are shown in the vertical position of the container and that for use, the various embodiments illustrated operate in the inverted position.

Figures 1, 2:
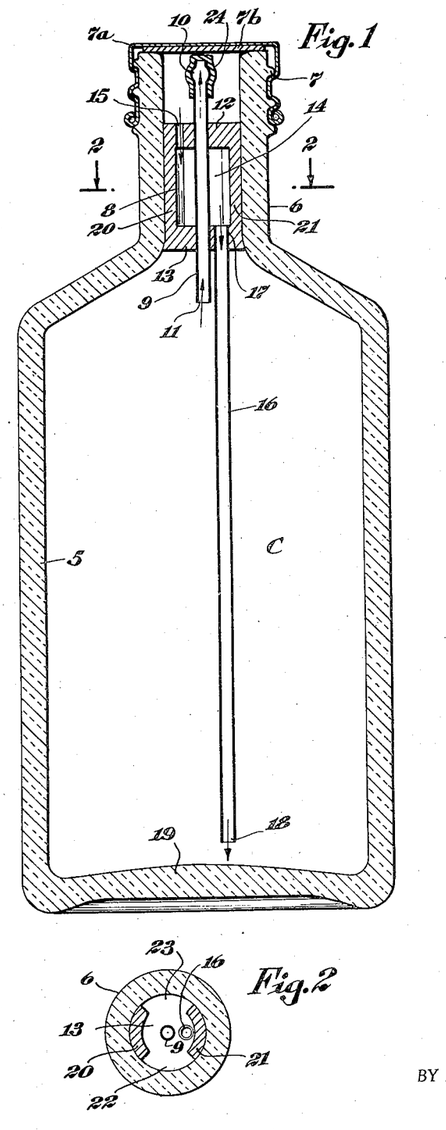
Figure 1 is a longitudinal sectional view of one embodiment of my invention, showing a merchandisable container and dispensing device completely assembled.
Figure 2 is a section taken on the line 2—2 of Figure 1.

Making more particular reference to the drawings in connection with the embodiment illustrated in Figure 1, the liquid dispensing device comprises a container C, in the form to provide a merchandising package of completely sealed fluid. Where the same is particularly to be used as an appliance for dispensing fluids used in intravenous or subcutaneous injections, such as blood for transfusion purposes, physiological salt solutions, glucose solutions, and other fluids in the field of medicine, the entire assembly, in completely sterile condition, is packaged at some centralized point, from which point it may be distributed, to be used by the medical profession either at isolated points where modern facilities are not available, or in hospitals, where it may be stored, to be in readiness on an instant's notice, to supply the demands for such materials.

Thus, while previously a certain amount of preparation was involved in dispensing fluids of the character contemplated by this invention, by the provision of the device contemplated by this invention, packages of the necessary fluids and the dispensing means therefor may be prepared and provided as a complete assembly, to await the occasion for its need.

The container C has the usual bottle-like body 5, and a neck 6, which may be provided with a conventional external screw 7, to which may be applied a screw cap 7a, interposing a suitable gasket 7b, for sealing the same. Within the interior of the neck, I provide an insert 8, serving as a mount for a fluid conducting tube and air filter assembly comprising a fluid duct or tube 9, having an outer beaded end 10, and an inner opening 11, extending into the interior of the container C for a short distance beyond the neck. This duct or tube passes through the outer wall 12, and the inner wall 13 of the insert 8 previously described, said insert presenting between these walls a chamber 14.

The outer wall 12 is provided with an orifice 15, serving as an air inlet. The inner wall 13 has supported therein an air duct or tube 16, whose upper end 17 is supported in the wall 13, frictionally or screw threaded, or by other suitable fastening means.

Where the ducts or tubes 9 and 16 are made of glass and the insert 8 of rubber, frictional engagement between these members will be found sufficient. It will be understood, however, that the parts may be of metal, plastics such as Bakelite, of hard rubber, or of glass, as may be deemed expedient. It will also be understood that where the insert 8 is made of rubber, a driving fit will be sufficient to hold the assembly within the interior of the neck 6, but otherwise other fastening means may be employed to hold the insert 8 within the interior of the neck 6.

It will be understood that the air duct or tube 16 has its lowermost end 18 extending near the bottom 19 of the container.

While the insert 8 may be a hollow member, it is preferred that the outer wall 12 and the inner wall 13 be connected by spaced webs 20 and 21 respectively, leaving clear portions 22 and 23 therebetween, for purposes which will appear more clearly as this description proceeds.

With the device as described provided, forming a packaging container and dispensing device, upon removal of the cap 7a, the container is filled with the desired fluid either before or after inserting the neck insert and its assembly. Where the neck insert 8 and the assembly carried thereby are first inserted into the neck 6, the entire assembly may be cleansed, matured and sterilized, and in this form and held in inverted position, fluid may be forced through the fluid duct 9 by filling apparatus, air being displaced through the orifice 15 after passing through the air tube 16. When the container has been filled to the point just reaching the end 18, the container is again inverted and to the fluid tube 9, at the end 10, there is applied the sealing tip 24. Thereafter, and if necessary, additional sterilizing treatment may be given to the container and contents, and then the sealing cap 7a applied in position.

This provides the merchandising package.

When ready for use, the cap 7a is removed by unscrewing, where this type of connection is used, and the tip 24 removed from the liquid flow tube 9. In place of the tip 24 there then may be attached the tube 25, carrying the hypodermic needle 26, more clearly shown in Figure 3.

It will be understood that while I have described and prefer my assembly for dispensing for injection purposes, this is primarily for purposes of exemplification of my invention.

With the assembly thus provided, the entire container C and its liquid contents, are inverted, applying some pinch means for the tube 25, to prevent a premature flow of the liquid.

It will be observed that the liquid used to fill the container having been brought to a point just below the lowermost end 11 of the liquid flow tube, a supply of liquid will be retained within the air duct 16 and which, on inversion, will be deposited within the chamber 14. When ready for dispensing the fluid, the fluid will leave through the liquid tube 9. A constant flow and continuous column of fluid will be assured by the admission of air through the air tube or duct 16, entering the same through the orifice 15, but passing through the chamber 14 completely or partially filled with the fluid deposited from the tube 16. Thus it will be observed that as the fluid leaves the fluid duct or tube 9, air enters into the space displaced by the fluid but passing through the liquid in the chamber 14, which serves to filter out any dust particles, lint or other material which may be entrained in the air.

In the operation of this device the liquid retained within air duct 16 will be deposited within the chamber 14 and remains therein without running out. The inversion of the container C leaves a vacuum within the container in the vicinity of the bottom 19. This means that the normal atmospheric pressure applied at 15 is greater than the pressure within chamber 14. As soon as the pinch means for the tube 25 is released to permit the flow of liquid from the container, the air coming in through air inlet 15 enters at a constant rate and keeps the liquid within the chamber 14. This retention of liquid in the chamber 14 is further aided by two well known phenomena. The air inlet 15 is made very small in comparison with the other members making up this dispensing means, and therefore the phenomena of skin resistance of materials such as glass and the surface tension of liquids further aid in keeping the liquid in the chamber 14.

By providing the neck of the bottle 6 of clear glass, the operation of the dispensing device may be observed. By viewing the chamber 14 through the clear portions 22 and 23, at which points there will be observed the bubbling and washing operation of the air as it passes through the fluid contained in the chamber 14, the rate of flow and its regularity may be ascertained from the nature and character of the bubbles passing through the liquid in the chamber 14.

It will further be observed that the opening 11 is at a point well above the wall 13 when the container is in an inverted position so that any insoluble material will separate out and will not leave through the opening 11 so that the space between the opening 11 and the wall 13 acts as a sedimentation zone.

It will further be observed that by direct separation of the fluid in the chamber 14 from the interior of the container C, no contamination can occur of the fluid to be dispensed and if the fluid is affected by air, the minimum contamination thereof will occur as the incoming displacing air does not mix with the fluid that is being dispensed, merely passing to the portion of the container adjacent the bottom 19.

In this manner it will be observed that I have provided a device which completely eliminates contamination, yet at the same time provides a constant or continuous column of fluid to be dispensed as there is a direct interchange between the fluid gravitating from the duct 9 and the air entering into the container to displace the same.

Figure 3:
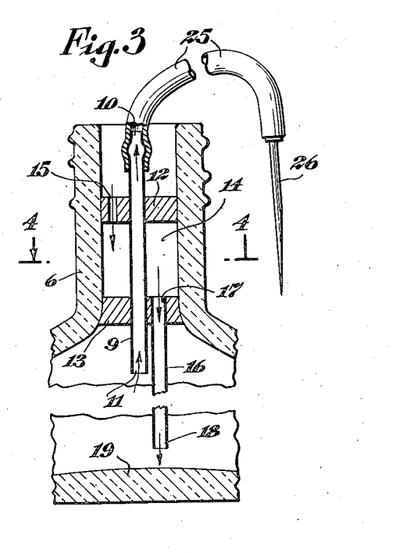
Figure 3 is a fragmentary longitudinal sectional view of another embodiment ready for use, but immediately before inversion for this purpose.
Figure 4:
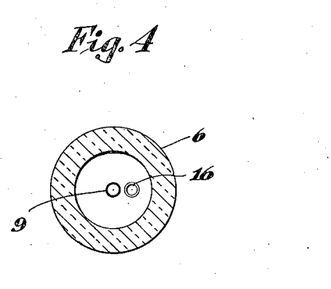
Figure 4 is a section taken on the line 4—4 of Figure 3.

In Figures 3 and 4 I have illustrated a construction embodying all the features of Figure 1 except that the outer wall 12 and the inner wall 13 are not connected in any way, so as to provide a clear portion therebetween, constituting the chamber 14, the device otherwise, in all respects, operating identically with that illustrated and described in connection with Figure 1.

Figure 5:
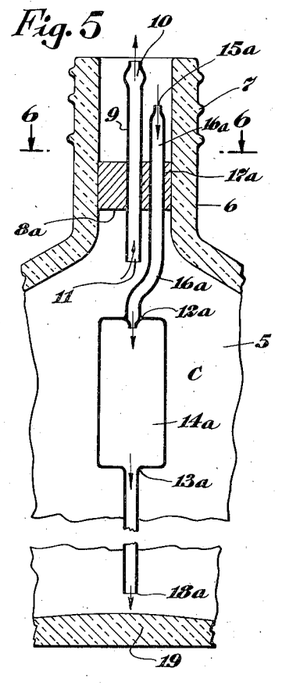
Figure 5 is a fragmentary longitudinal sectional view of another embodiment of my invention.
Figure 6:
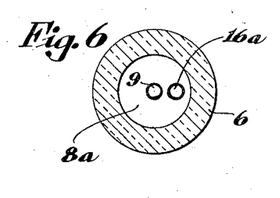
Figure 6 is a section taken on the line 6—6 of Figure 5.

In Figure 5 another embodiment of my invention is illustrated in which the container C may be of the same construction as shown in Figure 1 and in whose neck 6 there is provided an insert 8a which serves as a mount for an air filter and fluid conducting tube assembly. In this view, the fluid duct 9 is of substantially the same construction as in the previous embodiments, and is retained within an orifice formed through the insert 8a.

The air filter and fluid conducting assembly is provided by an enlarged cylindrical tube, preferably of glass, whose lower wall is defined at the partition 12a and whose upper wall is defined by the partition 13a, having therebetween the air filter compartment 14a. The inlet 15a is formed in the tube 16a and lies to the outer side of the insert 8a and passes through the orifice 17a, formed in the insert 8a and connects with the partition 12a previously described. Extending through the partition 13a there is provided the tube 18a, terminating at a point adjacent the bottom 19.

The operation of the device shown in Figure 5 is otherwise similar to that shown in Figure 1.

When the container is full, the liquid in the container C will fill the compartment 14a. Upon inversion of the device from the form shown in Figure 5, for purposes of dispensing the liquid from the container, liquid will leave through the liquid duct 9 and air will enter the container through the orifice 15a, rising upwardly through the tube 16a and being discharged adjacent the bottom 19 through the tube 18a. However, the air so discharged will pass through the liquid retained within the filter compartment 14a. The liquid retained in compartment 14a does not run out through air inlet tube 16a for the same reasons which have been discussed in connection with compartment 14.

By disposing the compartment 14a just above the neck inside of the container, a supply of fluid within the filter compartment 14a is assured, upon inversion of the container for purposes of dispensing. The liquid so retained within the compartment 14a and which filters out any material which may be entrained in the air, cannot thereafter contaminate the fluid that is being dispensed.

The enlarged portion formed by the compartment 14a assures a clear air space in the tube 18a so that air may displace the fluid being dispensed without causing variation in the rate of flow and assuring a uniform and continuous column of liquid for dispensing purposes.

It will be observed that the fluid dispensing tube 9 and air inlet tube 16a are retained within the neck of the bottle 6 as in the embodiment illustrated in Figure 1 so that the packaging operation, after sterilization, seals these members.

It will be understood that while the assembly thus far described may be filled after inserting the neck insert and its assembly, comprising the air filter and the fluid conducting tube, nevertheless that the container may be first filled with fluid up to the proper level, in the upright position as illustrated, and thereafter the assembly comprising the air filter and fluid conducting tubes may be inserted, with their mounting means in the form of the neck insert.

Figure 7:
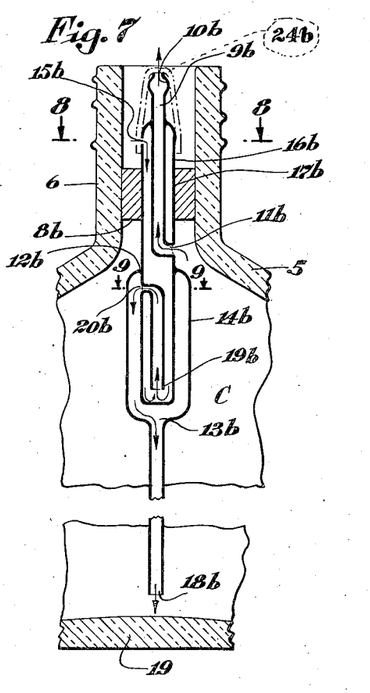
Figure 7 is a fragmentary longitudinal sectional view of another embodiment of my invention, showing a unitary air filter and fluid conducting assembly.
Figure 8:
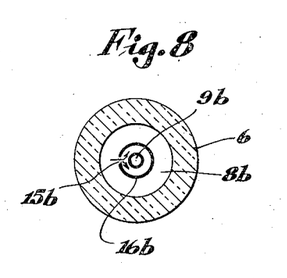
Figure 8 is a section taken on the line 8—8 of Figure 7.
Figure 9:
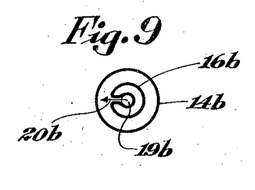
Figure 9 is a section taken on the line 9—9 of Figure 7.

In Figure 7, I have illustrated an air outlet and fluid conducting tube assembly which may be made as an integral construction and is most suitable where the parts are made of glass. In this embodiment, the neck insert 8b may be frictionally held within the neck or otherwise connected and through an orifice centrally thereof, there is frictionally held the integral air filter and fluid conducting tube assembly in which 9b is the fluid duct, provided at its outer end with the beaded end 10b. The inner end of the fluid duct 9b terminates adjacent an opening 11b on the interior of the container. The enlarged cylindrical tube defined by the upper partition 12b and the lower partition 13b provides the compartment 14b. Air may enter the same through the orifice 15b formed in the tube 16b, passing through the orifice 17b, in the neck insert 8b previously described, and said tube 16b is sealed to the compartment 14b adjacent the partition 12b.

The tube 16b extends well within the compartment 14b and is sealed at its extremity. Extending beyond the partition 13b, the restricted tube 18b is provided, which terminates adjacent the bottom 19. Coaxial with the tube 16b there is provided a tube 19b, terminating laterally adjacent the orifice 20b.

With the construction thus provided, the entire assembly may be slipped into the neck of the bottle, after first filling the container C or the filling operation may be conducted through the tube 9b by forced filling operations as described in connection with the embodiment illustrated in Figure 1.

When the device is filled to a point just below the opening 11b, fluid will rise into the compartment 14b. Upon inversion of the contrivance for dispensing apparatus, fluid will be trapped within the compartment 14b. In this form upon inversion the liquid in the upper part of air inlet tube 18b is retained in the compartment 14b for the reasons already discussed in connection with compartment 14 above, aided by the trapping means here disclosed.

The fluid for dispensing will leave through the tube 9b, discharging through the opening 10b and entering into this duct through the opening 11b. This opening is positioned at a point spaced from the insert 8b so that sediment which may be in the liqiud is not discharged, the overflow point being at a point above the zone of sedimentation.

Air will enter through the orifice 15b, and be directed through the tube 16b, coaxial with the tube 9b, for a portion of its length and then be directed through the tube 19b, the orifice 20b, and bubble through the liquid retained in the air filter compartment 14b.

The device otherwise operates as previously described except that by reason of the provision of the inverted tube 19b, no liquid will be entrained, to be discharged through the orifice 15b, at any time, thus assuring the minimum amount of obstruction to the incoming air necessary to replace the outflowing liquid, and at the same time assuring that none of the incoming air will enter the container without being washed free of any materials entrained in the air before being discharged through the tube 18b into the container.

Figure 10:
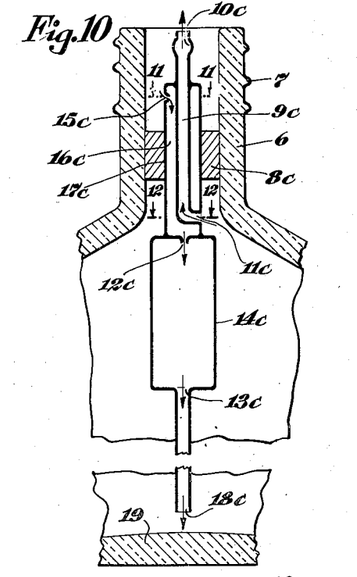
Figure 10 is a fragmentary longitudinal sectional view of still another embodiment of my invention illustrating a unitary air filter and fluid conducting assembly.

Referring now to the embodiment illustrated in Figure 10, a neck insert 8c serves to suspend and hold the air filter and fluid conducting tube assembly in which 9c is the fluid duct, having at its outer end 10c a beaded portion to receive a dispensing tube, and having its inner end adjacent the orifice 11c. A cylindrical chamber, formed with an orifice 12c and an opening 13c, provides the air filter chamber 14c to which air may be directed through the orifice 15c in the tube 16c, sealed to the compartment 14c previously described, and positioned to surround the fluid duct 9c. The tube 16c is frictionally held within an orifice 17c formed in the insert 8c.

The compartment 14c, at its innermost portion, is connected with the tube 18c, terminating adjacent the bottom 19.

The operation of the device otherwise incorporates the primary features of the embodiments previously described and especially in connection with Figures 5 and 7.

Figure 13:
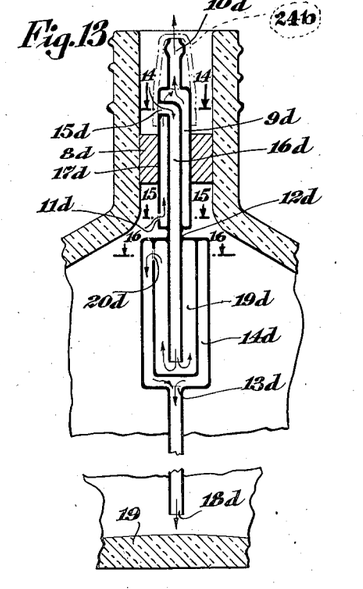
Figure 13 is a still forther embodiment of my device, illustrating a unitary air filter and fluid conducting assembly.

In Figure 13 I have described a still further embodiment of my invention wherein the air filter and fluid conducting assembly is mounted and supported by the insert 8d and comprises a fluid duct 9d, terminating at its outer end 10d with a beaded portion for connection to a dispensing tube and having directed inwardly of the container, an opening 11d at a side wall.

A cylindrical compartment defined by the partition 12d at the upper side and the lower portion 13d at the lower side, outlines the air filter compartment 14d, into which, through the opening 15d, air may be passed along the air tube 16d, terminating well within the compartment 14d just described, and coaxially with the fluid duct 9d.

Surrounding the terminal portion of the tube 16d there is provided a compartment 19d, having an orifice 20d adjacent the partition 12d. Extending beyond the partition 13d is the tube 18d, terminating near the bottom 19.

The operation of this embodiment includes the primary features outlined in connection with the embodiment illustrated in Figure 7 in that liquid entrapped within the compartment 14d, upon inversion of the entire assembly, will not gravitate out through the tube 16d and affect the uniform entrance of air. By arranging the fluid duct 9d to encircle the air duct 16d, observation of the fluid as it is being dispensed, may be readily made. Here again the filtering liquid is retained in compartment 14d, not only because of the greater pressures at 15d, the skin resistance of the material and the surface tension of the liquids, but also trapping means here disclosed.

Figures 11, 12, 14, 15, 16, 17, 18, 19:
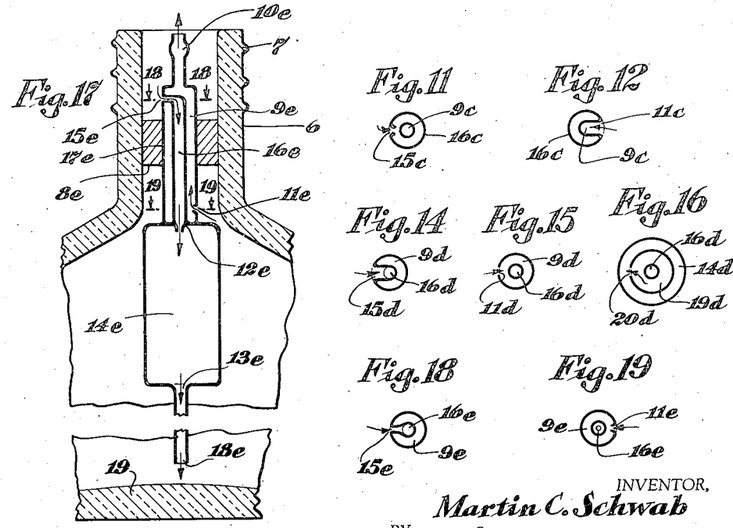
Figure 11 is a section taken on the line 11—11 of Figure 10.
Figure 12 is a section taken on the line 12—12 of Figure 10.
Figure 14 is a section taken on the line 14—14 of Figure 13.
Figure 15 is a section taken on the line 15—15 of Figure 13.
Figure 16 is a section taken on the line 16—16 of Figure 13.
Figure 17 is a still further embodiment of my invention, illustrating another form of integral air filter and fluid conducting assembly.
Figure 18 is a section taken on the line 18—18 of Figure 17.
Figure 19 is a section taken on the line 19—19 of Figure 17.

In Figure 17 I have illustrated a still further embodiment of my invention in which the neck insert 8e serves to support the air filter and fluid conducting tube assembly in which 9e is the fluid duct, terminating at its outer end 10e with a beaded end for connection to a dispensing tube and having its inner end terminating adjacent an orifice 11e, spaced from the insert 8e, thereby to provide a sedimentation zone when the dispensing device is inverted. A cylindrical member defined at the upper portion by the partition 12e, formed with an orifice, and at its lower portion by the partition 13e, provide the air filter compartment 14e. Air may enter through the orifice 15e formed laterally in the tube 9e, and connected with the air duct 16e, said air being directed through the compartment 14e and inwardly to the tube 18e which terminates adjacent the bottom 19.

In this embodiment the operation is closely similar to the embodiment illustrated in Figure 13 and where the container is formed of transparent material, such as glass, it permits of ready observation of the air filter compartment and the fluid discharge duct 9e.

Figure 20:
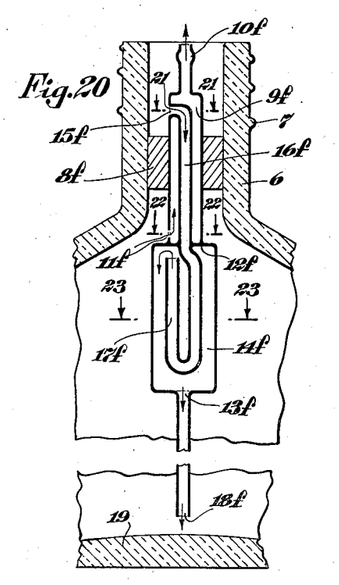
Figure 20 is a still further embodiment of my invention, showing a unitary air filter and fluid conducting assembly.

In Figure 20 I have illustrated another embodiment of my invention in which the neck insert 8f serves to mount and support the air filter and fluid conducting tube assembly which comprises a fluid duct 9f, terminating outwardly at the end 10f with a beaded portion for connection to a dispensing tube. Inwardly, and within the container and spaced from the insert 8f, an orifice 11f is provided, at a point to provide a sedimentation zone. The cylindrical compartment defined by the upper partition 12f and the lower partition 13f provides the air filter compartment 14f, into which air may be directed through the orifice 15f, and through the tube 16f, terminating in a U-shaped tube 17f, the exit end of which is adjacent the partition 12f. Air passing through the liquid in the compartment 14f is discharged through the tube 18f adjacent the bottom 19.

In this construction, the compartment 14f derives its fluid from the container in the manner previously described, and upon inversion, fluid cannot be discharged through the air duct 16f, nor can any air enter the container without passing through the liquid contained in the compartment 14f. Any turbulence by reason of the rate of flow of air through this compartment will not discharge any fluid from the compartment 14f, through the tube 18f, thereby effectively avoiding any contamination between the fluid used for air filtering in the compartment 14f and that to be dispensed from the container C.

Figure 24:
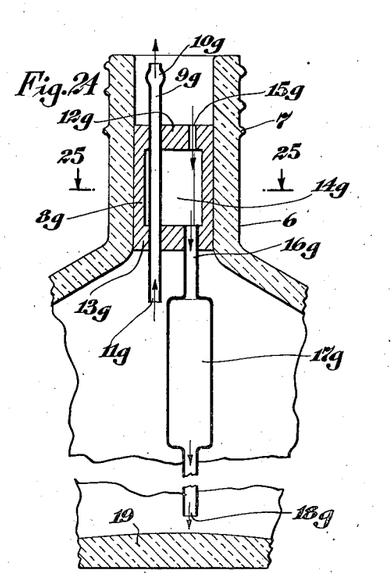
Figure 24 is a still further embodiment of my invention, illustrating a combined air filter and auxiliary fluid supply therefor.

In Figure 24, I have illustrated a still further embodiment of my invention in which the features previously described in connection with Figure 1 are illustrated, and in which the neck insert 8g is provided with a fluid duct 9g, terminating at its outer end with a beaded portion 10g, and its inner portion with an opening 11g. The fluid duct passes through the outer partition 12g and the inner partition 13g, defining the compartment 14g. Air may enter through the orifice 15g formed in the outer partition 12g, pass through the compartment 14g and into a tube 16g, held by the partition 13g and then to the enlarged portion 17g, from which extends the tube 18g which, terminates near the bottom 19.

In this construction, the enlarged tube portion 17g acts in the nature of an auxiliary fluid supply so that upon inversion of the container for dispensing purposes, fluid from the enlarged portion 17g will flow into the compartment 14g, acting as the air filter. The enlarged portion 17g further serves to break up the expanding air bubbles, preventing entrainment of the liquid, serving as the air filter through the tube 18g and preventing contamination of the liquid to be dispensed, and also assuring a uniform rate of discharge of liquid by uniform resistance the liquid provides to incoming air.

Otherwise, the neck insert 8g includes the spaced webs 20g and 21g, providing the clear portions 22g and 23g to permit viewing of the air filter compartment 14g.

Figures 21, 22, 23, 25, 26, 27:
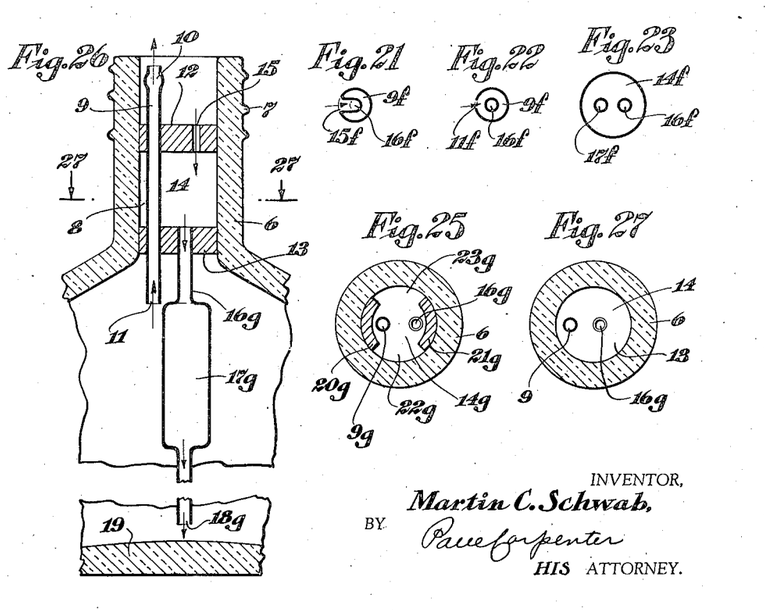
Figure 21 is a section taken on the line 21—21 of Figure 20.
Figure 22 is a section taken on the line 22—22 of Figure 20.
Figure 23 is a section taken on the line 23—23 of Figure 20.
Figure 25 is a section taken on the line 25—25 of Figure 24.
Figure 26 is another embodiment of my invention of the character referred to in Figure 24.
Figure 27 is a section taken on the line 27—27 of Figure 26.

In Figure 26, I have illustrated the addition of the auxiliary fluid chamber to be used in connection with the embodiment illustrated in Figures 3 and 4.

In Figures 28 to 31 I have shown a dispensing device in the form of a container C, as previously described. In this construction, however, to the neck 6, having the screw threaded portion 7, there is provided a cap 7c, formed with an orifice 7d, through which a portion of the air filter and fluid conducting tube assembly projects.

Figure 28:
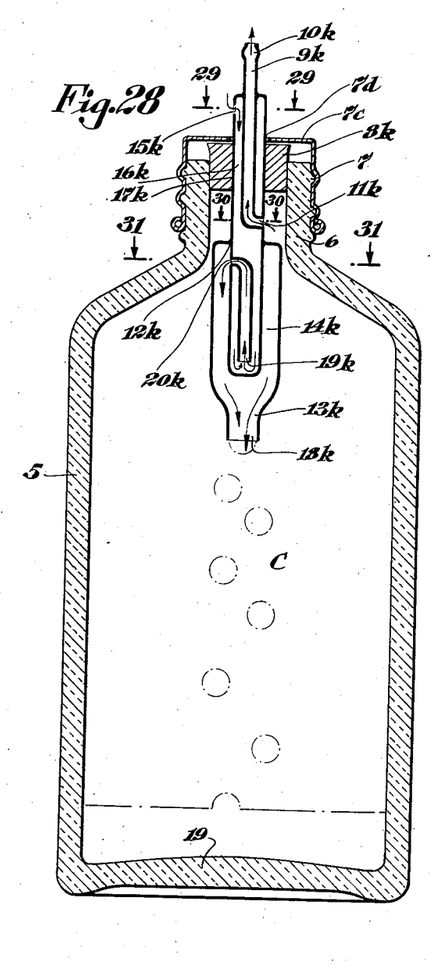
Figure 28 is a longitudinal sectional view of another embodiment of my invention, in which a unitary air filter and fluid conducting assembly may be associated with the sealing cap of the container.
Figure 29:
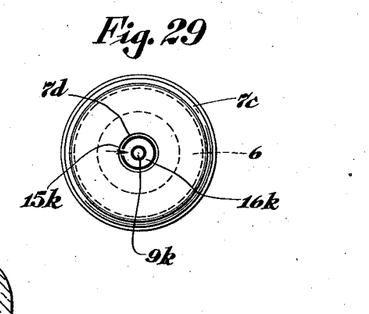
Figure 29 is a section taken on the line 29—29 of Figure 28.
Figure 30:
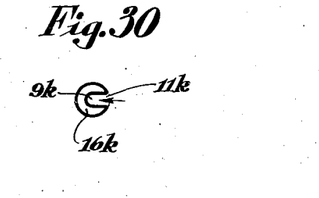
Figure 30 is a section taken on the line 30—30 of Figure 28.
Figure 31:
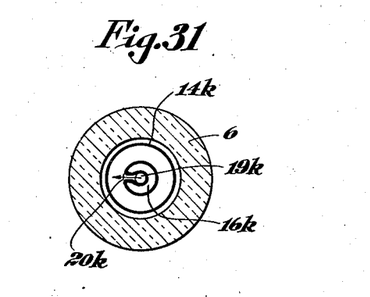
Figure 31 is a section taken on the line 31—31 of Figure 28.

In this construction, an insert in the form of a plug or stopper 8k is inserted and limited for projection into the interior of the neck 6 by tapering somewhat, so that it may be readily removed without any special instrumentalities. This insert serves to support the air filter and fluid conducting tube assembly in which 9k is the fluid duct terminating outwardly in an opening 10k, formed with a beaded portion as previously described. The inner portion of the fluid duct 9k terminates at the interior of the container in an opening 11k. A partition 12k and a neck 13k define the air filter compartment 14k, to which air may be conducted from the orifice 15k, open to the atmosphere, through the air tube 16k, surrounding the fluid duct 9k, previously mentioned.

The air tube 16k is held within the insert 8k in an orifice, formed therein, frictionally. The innermost portion of the tube 16k is closed, and is sealed at its approximate medial portion into the partition 12k. Centrally of the air tube 16k there is provided an inwardly directed tube 19k, which has its exit portion laterally extended into a side wall of the air tube 16k forming the opening 20k, through which the air may escape through any liquid within the compartment 14k when the assembly is inverted. The air then escapes through the neck 13k and its extension 18k.

This form of construction will serve to retain the air filter compartment 14k filled with liquid, and the relationship between the orifice 20k and the tube 18k is such that the air cannot displace the liquid in the compartment 14k but is given the opportunity for expansion, without displacing the liquid within the compartment 14k, and without contaminating the liquid to be dispensed.

The construction further provides an air filter and fluid conducting assembly which need not be permanently assembled with the container but may be associated therewith when necessary for use, the cap 7c also serving as a means to retain the frictionally held plug in association with the neck of the bottle.

It will be understood that while the cap 7c is shown with the orifice 7d, when merchandised in the sealed form, prior to the insertion of the plug or insert 8k, the container without the air filter and fluid conducting tube, is sealed by a gasket fully covering the neck of the bottle 6, and held in this position by the cap 7c.

In Figures 7 to 20 and 28, a single tip or seal 24b (shown in dotted lines) may serve to cover both the fluid outlet tube and the air inlet orifice, thus insuring the retention of the assembly in a sterilized condition, in a facile manner.

In all forms shown, it will be understood that the size of the fluid outlet is related to the size of the air inlets so that the rate of flow of liquid from the fluid ducts will maintain a balanced condition, preventing the flow of fluid from the air filter compartments when the devices are inverted. However, I may, if so desired, use a valving device such as shown, and specifically claimed, in my application Serial No. 22,062, which is a division of Patent No. 2,010,417, for the end of the air duct adjacent the bottom 19.

In such form, the valve will be open when the bottles or containers are held in an erect position, but will be seated when inverted and in readiness for discharge of liquid from the liquid duct while a tube pinching closure or similar flow control means is maintained in position. Upon a change in conditions, starting the flow of liquid, the diminished air pressure or partial vacuum formed in the container will unseat the valve, permitting the admission of air, providing an atmospheric pressure head within the container.

It will thus be observed that I have provided a liquid dispensing device which may be merchandised as a complete assembly, with the fluids to be used, and any one desiring to dispense the fluid, for any purpose, need only be concerned with the sterilization of the connecting tube and hypodermic for injection, the remainder of the assembly having been previously sterilized and made in readiness at the centralized bottling and assembling point.

While I have emphasized the novelty of the construction, for purposes in the field of medicine, it will be understood that this device has a wider field of utility, which will be readily understood by those skilled in the art.

It will further be observed that while I have described my assembly as having particular utility by reason of the fact that it provides a device which may dispense fluids without contamination by the materials carried by air, thus effectively filtering the air which is necessary for displacing the fluid which is being dispensed, the air passage provided for displacing the liquid also serves as a vent for filling purposes when the container is being filled, with the air filtering and dispensing assembly in position. This air duct permits sterilization of the container and of the liquid after filling and permits discharge of any entrained air, and capping to effect a vacuum sealing of the thus sterilized container and contents.

Having thus described my invention and illustrated its use, what I claim as new and desire to secure by Letters Patent, is—

1. A self-contained fluid container and dispensing device operable upon inversion and of the character described comprising, in combination with the neck of said container, an air filter chamber and fluid conducting tube assembly comprising spaced walls forming a fluid chamber, a fluid conduit extending through said spaced walls from a point within said container to a point accessible through the neck of said container, an air conducting tube suspended from one of said walls and an air inlet through the other of said walls.

2. A self-contained fluid container and dispensing device of the character described comprising, in combination with the neck of said container, an air filter chamber and fluid conducting tube assembly comprising spaced walls forming a fluid chamber, a fluid conduit extending through said spaced walls from a point within said container to a point accessible through the neck of said container, an air conducting tube suspended from one of said walls and an air inlet through the other of said walls, the neck of said container and walls aforementioned providing an air filtering chamber.

3. A self-contained fluid container and dispensing device operable upon inversion comprising in combination, a chamber for fluid formed by spaced inserts within the neck of said container, an air inlet to said chamber for directing and conducting the air through the liquid in said chamber and into said container, a conduit through said inserts for liquid discharge from said container, the interior of said chamber being visible through the neck of said container.

4. In combination with a container, an air filter and fluid dispensing assembly operable upon inversion comprising a casing forming a fluid chamber, conduits connected with said chamber, one open to the atmosphere, the other connected with the interior of said container, a liquid tube leading from a point interiorly of said container to a point accessible from the exterior of said container, and means for suspending said tubes within the neck of said container.

5. An air filter and fluid dispensing assembly operable upon inversion comprising a fluid chamber adapted to be disposed within a container, an air tube adapted to be directed interiorly of said container, an air inlet to said chamber, a fluid conducting tube coaxially arranged with said air tube having inlet and outlet passages independently of said air tube.

6. An air filter and fluid dispensing assembly operable upon inversion including a fluid chamber insertible through the neck of a container and including an air inlet and an air outlet, the latter of which serves as an inlet for fluid to the interior of said chamber from said container, and means for suspending said assembly within the chamber including an independent fluid discharge conduit.

7. An air filter and fluid dispensing assembly operable upon inversion for a container, comprising a fluid discharge conduit and an air filtering chamber in non-communicating relationship, an air inlet to said chamber, and an air outlet tube from said chamber serving as means for filling said chamber with fluid, said outlet tube including means for holding an auxiliary supply of liquid.

8. An air filter and fluid dispensing assembly operable upon inversion for a container, comprising a fluid discharge conduit and a fluid retaining member forming an air filtering chamber in non-communicating relationship to said fluid discharge conduit, an air inlet to said member, and an air outlet from said member including an enlarged portion for retaining liquid in said member during the passage of air therethrough.

9. A self-contained fluid container and dispensing device operable upon inversion, comprising in combination with said container, an air inlet duct extending into a bottom portion of said container, the upper end of said air inlet duct being below the mouth of the container, an air washing chamber formed in an intermediate portion of said air inlet duct, a fluid dispensing duct, the upper end of said fluid duct terminating below the mouth of said container for attachment thereto of a dispenser tube for subcutaneous or intravenous injections, means inserted in the neck of said container for suspending said air inlet duct and said fluid dispensing duct within the container, and a closure for the neck of the container for sealing said ducts and means.

10. A self contained fluid container and dispensing device operable upon inversion, comprising in combination with said container, an air inlet duct for directing and conducting air into the bottom of said container, a chamber for filtering incoming air forming an intermediate portion of said air inlet duct and containing as a filter a portion of the fluid to be dispensed, a conduit for discharging fluid from said container, and means inserted in the neck of said container for suspending said air inlet duct and said conduit within said container, the interior of said chamber being visible through the material of which said container is formed.

11. A self contained fluid container and dispensing device operable upon inversion, comprising in combination with said container, a chamber to filter incoming air having as a filter a portion of liquid to be dispensed, an air inlet to said chamber, an air outlet from said chamber to the bottom portion of said container, said outlet serving as an inlet for filtering fluid to said air filtering chamber, a conduit for discharging liquid from said container and means inserted in the neck of said container for suspending said air inlet, said air outlet and said liquid conduit within said container, the interior of said chamber being visible through the material of which said container is formed.

MARTIN C. SCHWAB.